Sept. 17, 1946.  E. SEIFRIED  2,407,850
SUB-AQUEOUS ELECTRIC CUTTING
Filed June 18, 1926  6 Sheets-Sheet 1

Inventor:
E. Seifried,

Sept. 17, 1946. E. SEIFRIED 2,407,850
SUB-AQUEOUS ELECTRIC CUTTING
Filed June 18, 1926 6 Sheets-Sheet 2

Inventor:
E. Seifried,
by
E. F. Wenderoth
Atty.

Sept. 17, 1946.                    E. SEIFRIED                      2,407,850
                              SUB-AQUEOUS ELECTRIC CUTTING
                              Filed June 18, 1926          6 Sheets-Sheet 4

Inventor:
E. Seifried,
By
C. F. Wendroth
Att'y.

Sept. 17, 1946.   E. SEIFRIED   2,407,850
SUB-AQUEOUS ELECTRIC CUTTING
Filed June 18, 1926   6 Sheets-Sheet 5

Inventor:
E. Seifried,
By
E. F. Wenderoth
Att'y.

Patented Sept. 17, 1946

2,407,850

UNITED STATES PATENT OFFICE 2,407,850

SUBAQUEOUS ELECTRIC CUTTING

Eugen Seifried, Waldkirch in Breisgau, Germany, assignor to United States of America, as represented by the Secretary of War Application June 18, 1926, Serial No. 116,926

17 Claims. (Cl. 219—11)

This invention relates to a new apparatus for clearing mine fields, wherein the mine anchor cables are severed preferably through the instrumentality of an electric current.

While hitherto inconvenient and tedious methods were necessary for locating and severing mine, that is steel wire, cables under water, this invention discloses how the cutting may be accomplished continuously by vessels in movement without reducing the speed of the latter.

While the invention relates particularly to war operations, for clearing mine fields, it may also be used for locating and removing wrecks, buoys, anchors, etc.

The invention contemplates connecting the vessels used for removing the mines with special search or drag lines which, on making contact with the mine cables to be severed, carry them to specially formed electrodes which are dragged along under water by and behind the vessels and which electrodes are provided with severing points where the mine cables are subjected to the fusing action of an electric current.

The general idea of such a severing method may not be entirely novel in theory with respect, for example, to the cutting of metal parts under water per se. Practical operation of carrying out this general idea, however, involved such great difficulties that all previous proposals have been of little value.

Figure 1:
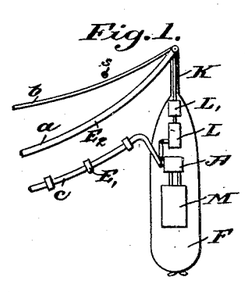
Fig. 1 is one form of the invention, and is a diagrammatic plan view as applied to a mine sweeping vessel.
Figure 2:
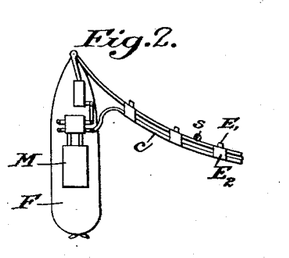
Fig. 2 is a modified diagrammatic plan view in which the drag line is secured to the electrode carrying line.
Figure 3:
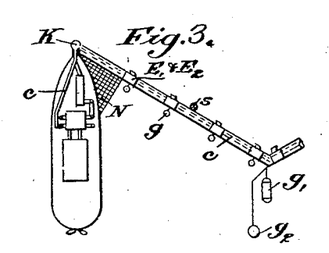
Fig. 3 is a modified arrangement in which the drag line and conductors are combined.

Referring first to Figs. 1 to 3 inclusive, in which are shown plan views of various modifications of the drag or search line assemblages, in each of these the mine sweeping or clearing vessel is designated by the letter F. In each view the source of electric energy whether D. C. or A. C. is indicated at M and the automatic switching apparatus at A. L indicates the apparatus for paying out and taking up the drag line as desired, while $L_1$ in Fig. 1, indicates an auxiliary either mechanical or electrical to be used in conjunction with L, the purpose of which will be more clearly explained hereinafter. K indicates the retaining and guiding devices for the traveling drag or search line $a$, while $s$ indicates in cross section the mine anchor cable which it is desired to sever. The current carrying conductor leads to the source of electricity are indicated by $b$ and $c$.

In these views the electrodes are indicated at $E_1$ and $E_2$.

In Fig. 3, a protective net is indicated at N, while $g_2$ indicates a locating or identifying buoy.

The operation is as follows: The vessels for locating and removing the mines are sent over the field of operation. Before reaching this location the complete severing chains and cables, attached either to the deck or outer sides of the vessels, are detached from their fastening and passed into the water by suitable apparatus, winches or the like, L, over guides K. A more detailed showing of these paying out and taking up apparatuses is omitted because they differ according to the vessels used and are of constructions readily understood by those skilled in the art. These devices are suitably provided with spring members in order to absorb shocks or sudden deviations of the vessel and to prevent injury to the several devices. When several vessels are used the cables may be detachably connected together.

When the cables pass out into the water they are first suspended with their heavier portion formed by the electric conductor cables $b$ and $c$ with the corresponding electrodes $E_1$ and $E_2$, in the form of a downward curve, whereby the vessels must observe a relatively favorable distance. The vessels then slowly advance and the severing apparatus, supported meanwhile by the leveling pressure effect of the flow on the drag line and electrode supports, begins to assume a horizontal position, that is substantially parallel to the surface, whereby the drag line $a$ takes up the main part of the work.

By reason of its weight the complete severing device, notwithstanding the flow pressure acting on its surfaces, is suspended at different depths. This defect may be remedied if necessary by known means, for example, by providing the electrode housing T with surfaces of different size, at the center of the curve with greater surfaces than in the vicinity of the vessels, or by the arrangement of differently inclined surfaces, whereby these act as rudders, or by various weights $g_1$, $g_2$, over the length of the connected cables, or by guides, wood fillers, hollow members, floats and the like, which are suitably weighted.

When the thus substantially horizontally moved severing device strikes an anchored mine cable $s$, seen in Figs. 1 and 2, by reason of the pendulous freedom of movement of the mine body and the inclination of the search or drag line $a$ with respect to the moved vessel, said mine cable $s$ slides along the search line and arrives at one of a pair of electrodes $E_1$ and $E_2$, connected to the source of energy M on the vessel through the current leads $b$ and $c$. As soon as contact is made with the two electrodes of different polarities, the mine cable is subjected according to the construction of the electrodes as direct or indirect contacts, at least at one point of contact, to the melting or fusing action of the electrical current and burned through. The severing operation of the electric current proceeds in well known manner.

The ascent of the mine now carries the mine bodies with the severed retaining cable rapidly to the surface of the water where the mine body is easily visible and where all severed mine bodies are collectable by a following vessel or may be directly exploded after their ascent whereby the route is again opened for other vessels.

Figure 4:
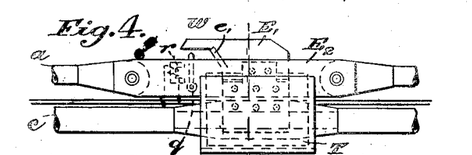
Fig. 4 is a view in elevation of an electrode combined with an auxiliary relay.
Figure 5:
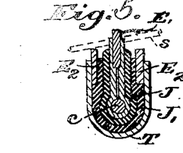
Fig. 5 is a cross section of the device of Fig. 4.
Figure 6:
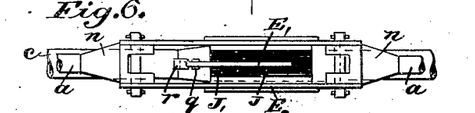
Fig. 6 is a plan view of the device of Fig. 4.

In Fig. 2 the drag or search line $a$ is provided as a current lead, see corresponding Figs. 4, 5 and 6 which show an elevation, cross section and the plan views respectively, of the electrode assemblage.

Fig. 5 shows a form in which only the one current lead $c$ including its electrode $E_1$ is insulated, while search line $a$ is used as the other current lead, together with the coupling members $E_2$, which here serve simultaneously as current leads and electrodes $E_2$ and the protective housing T, are without insulation. The active cutting surfaces of electrode $E_1$ are designated $e_1$.

Fig. 4 shows an electrical auxiliary apparatus $r$ $q$ the significance of which will be referred to hereinafter.

Figures 7, 8:
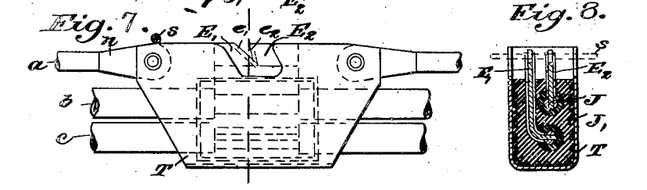
Fig. 7 is another form in elevation of electrode, which may be similarly suspended from the drag line.
Fig. 8 is a cross section of the device shown in Fig. 7.
Figure 9:
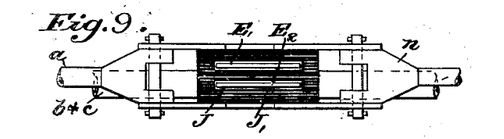
Fig. 9 is a plan view of the device shown in Fig. 7.

Figs. 7, 8 and 9 are elevation, cross section and plan views respectively of one form of the invention in which the drag line supports both conductor cables $b$ and $c$, each of which cables has connected to it at intervals one each of pairs of electrodes $E_1$ and $E_2$. These electrodes are arranged in pairs and instead of projecting beyond the surface of the drag line, the protecting housing T surrounding the pairs and the electrodes themselves are provided with notches in which the mine anchor cable $s$ is adapted to slide and be held during the severing operation. The active surfaces of the electrodes are shown at $e_1$ and $e_2$. In these forms as in the form illustrated in Figs. 4–6, the insulation between the conductor cables and the protecting housing T is shown at J and $J_1$. Here as in the previous views, the connecting elements between the parts of the drag line, are indicated $n$.

Figure 16:
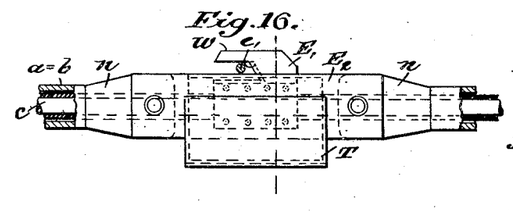
Fig. 16 is a view in elevation of a different form of electrode combined with grapple.
Figure 17:
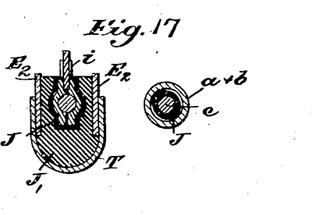
Fig. 17 shows cross sections of Fig. 16.
Figure 18:
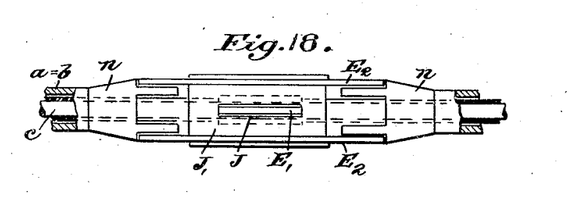
Fig. 18 is a plan view of Fig. 16.

Fig. 3 shows an arrangement in which one current lead is formed as an insulated cable $c$ and encompassed externally by the other current lead $b$, tubularly. The outer current lead $b$ in this case serves at the same time as drag or search line $a$ and as a protection for the inner cable lead $c$, see also Figs. 16, 17 and 18 showing elevation, cross section and plan views of the particular electrode assemblage. The outer current lead together with its connecting coupling members $E_2$, $E_2$ is not insulated. These connecting members here are the equivalents of the contact electrodes $E_2$ $E_2$ carrying the current over the steel cable of the search line $a$. In this arrangement also the protecting housings T, see Figs. 5, 8 and 17, may be provided with control or steering surfaces and steering bodies $g$ and $g_1$, in order to steer the chains at equal depth and also to increase safety, so that cutting electrodes are on the forward side and the claws of the grapples W engage the steel cable properly.

The search lines $a$ may be held in proper state of tension by means of special torpedo-like control or steering members $g_1$ and the position of the device is retained by means of the hollow elements or buoys $g_2$. In order to prevent the mines from endangering the vessel the device should first be adjusted below the keel of the vessel and the first severing contact arranged as far from the boat as possible. Finally, a net N may be provided at the bow of the vessel for the reception of severed mines.

In order to be independent of any possible rotation and twisting, etc., of the device, further embodiments are shown on Figs. 10, 11, 12 and 13, which assure contact of the cables to be severed with the electrodes. For this purpose the electrodes are arranged in star or cruciform shape on the cables.

Figure 10:
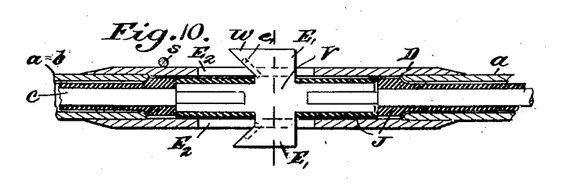
Fig. 10 is a longitudinal sectional view of one electrode having a star or cruciformed cross section.
Figure 11:
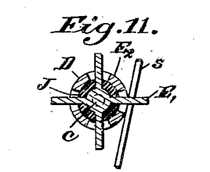
Fig. 11 is a cross section of the electrode shown in Fig. 10.

According to Fig. 10 the electrodes E' are attached to the inner insulated cable $c$. They are made of one piece together with the connecting member V which connects the inner cable ends $c$, and insulated as a whole, the cutting surfaces $e_1$ being left free. The outer current lead $b$, simultaneously forming a search and drag line is not insulated, its ends are connected by means of connecting elements D composed of several parts and adapted to be screwed together and which are hollowed out near the cutting electrodes $E_1$ and serve as current lead electrodes $E_2$. The cutting electrodes $E_1$ are here at the same time formed as grapple claws W.

Figure 12:
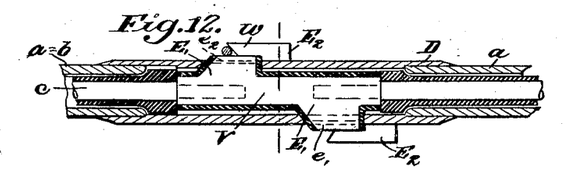
Fig. 12 is a longitudinal sectional view of further modification of the electrode of the general star cross section.
Figure 13:
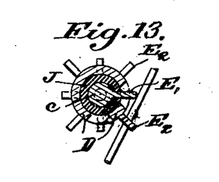
Fig. 13 is a cross section of the form of electrode shown in Fig. 12.

According to the construction shown in Figs. 12 and 13 the cutting electrodes $E_1$ are also attached to the inner insulated cable $c$ and formed of one piece with the members V connecting the cable ends. In this arrangement the grapple claws W are mounted on the connecting element D of the outer non-insulated current lead $b$ which at the same time serves the carrying function of the cable $a$. Also, the individual electrodes $E_1$ and $E_2$ are relatively displaced in order to increase the cutting action of one electrode.

Fig. 1 shows another arrangement in which an insulated current lead $c$ with cutting electrodes $E_1$ and a non-insulated independent search line $a$, freely movable therebefore, is used as the other current lead $b$, preferably designated as a contact line. When contact is made between a mine cable $s$ and the search line it yields by reason of the increasing pressure when the vessels are in motion and is moved back and to such an extent until the wire of the cable moving along the severing lead $c$ contacts with a cutting electrode $E_1$, closes the electric circuit and is cut through. After release of the pressure, that is after the cutting operation, the search line $a$ returns to its initial position or is moved there mechanically.

The yielding and returning of search line $a$ may be aided by positively actuated auxiliary control sliding devices $L_1$, whereby this positive movement is controlled electrically or mechanically by means of an auxiliary line which rapidly advances the contact and search line.

Figure 14:
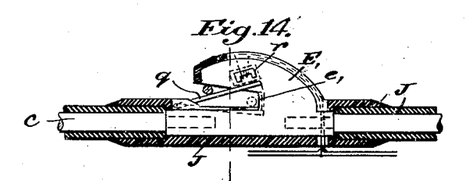
Fig. 14 is a longitudinal section of a modification of the combined electrode and relay form similar to Fig. 4.
Figure 15:
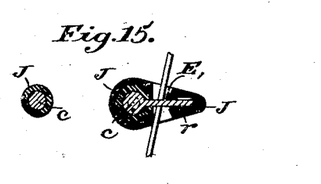
Fig. 15 shows cross sections of the device shown in Fig. 14.

Figs. 14 and 15 are longitudinal and cross-sections of details of the current lead $c$ formed as a severing device. The insulation and form of electrodes $E_1$ may be such that the backwardly and forwardly moved search lines $a$ (which at the same time serves the function of the lead $b$) make no contact with the cutting electrodes $E_1$ themselves and are thus not endangered.

The cutting electrodes $E_1$ as well as contact electrodes $E_2$ may be relatively displaced as desired, radially about the axis of the device as well as axially, with respect to the current lead, in order to assure engagement with the mine cable and proper contact therewith.

Fig. 14 also shows an electrical auxiliary relay apparatus described hereinafter.

The modifications which may be constructed are not exhausted by the examples given but may be evolved or developed according to the object to be accomplished.

In view of the great conductivity of sea water and the eventual wear on the electrodes it is preferable to connect in the severing current automatically only at the instant in which the mine cable contacts with the electrodes of both polarities and then again disconnect these, automatically.

Figure 19:
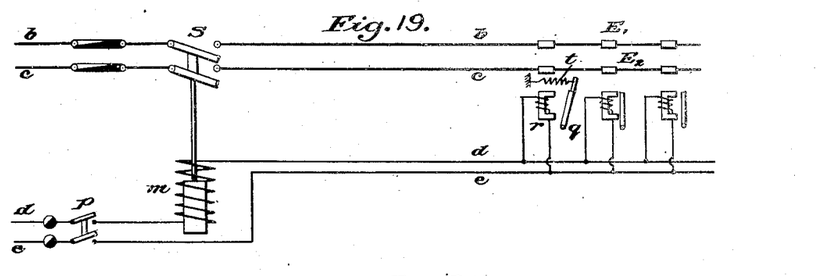
Fig. 19 is a schematic circuit diagram as used in this invention.

A suitable automatic connection or switch arrangement is shown in the circuit diagram Fig. 19. Here $b$ $c$ designate the main current leads passing to the electrodes and connected with the combined total electrical energy of the vessel preferably to a battery of great capacity. The vessels may be submarines, torpedo boats, auxiliary cruisers, battle ships, or special ships. For the electric current source however, use may be made of flywheel transformers, high speed A. C. or D. C. machines.

The characters $d$ $e$ represent auxiliary leads passing to an A. C. source and which extend independent of the electrode leads but, however, may be installed together with the main leads. The reference letters $r$ are small relays each with a movable armature $q$. The auxiliary leads $d$ $e$ pass over a solenoid switch $m$ which connects the source of electrical energy through suitable safety devices and contact member S to the electrode leads $b$ $c$.

Each pair of electrodes may be provided with such a relay. These are all connected in parallel and mounted adjacent the electrodes, see relay $r$ of Figs. 4 and 14. If a wire cable slides along search line $a$ it passes under grapple claw W of electrode $E_1$, moves armature $q$ from the excited relay $r$ and thus gives rise to a current impulse in the A. C. circuit $d$ $e$, see Fig. 19, the solenoid $m$ is excited, switch S closed and the electrodes thus connected with the source of energy. The electrodes now receive current of high intensity and the mine cable is severed. The armature $q$ is now released from the pressure of the mine cable and returned or drawn back by means of a spring member $t$ and the still excited relay $r$. With the return of the complete magnetic excitation of relay $r$ the current reception of the system with the solenoid $m$ connected in series, again decreases, switch S is disconnected and the source of energy separated from the electrodes. The plant is ready for a new cutting operation.

The diagram of Fig. 19 shows the simplest construction for automatically connecting and disconnecting the electrode current, wherein only one main switch need be closed and again opened.

Figure 20:
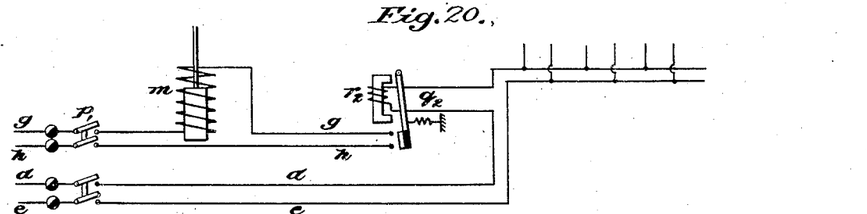
Fig. 20 is a modification of the circuit showing the use of a reinforcing main relay.

Fig. 20 shows a more sensitive arrangement wherein use is made of an intermediate or reinforcing relay $r_2$. This arrangement permits making the solenoid circuit independent and the use of any kind of current for exciting solenoid $m$. Relay $r_2$ is excited through each indicator relay $r$ in the same manner as in Fig. 19.

Figure 24:
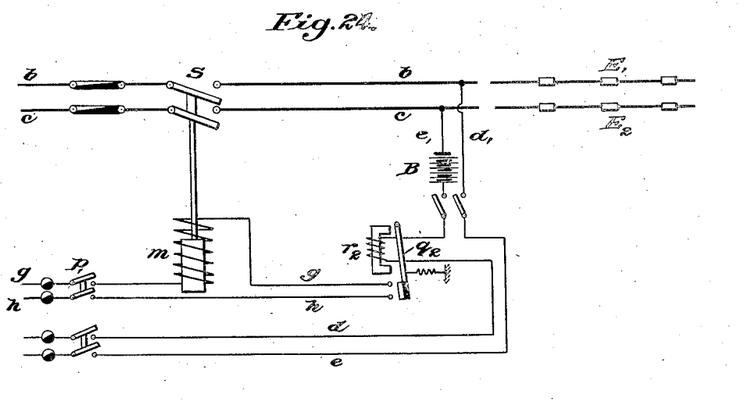
Figs. 24 and 25 are still further modifications respectively of the general arrangement of circuit shown in Fig. 20.
Figure 25:
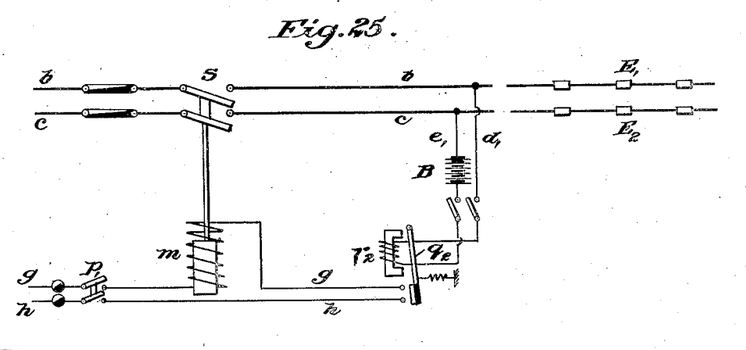

Figs. 24 and 25 show how, by means of a battery B, direct connection with the electrode leads may be made. The relays $r$ are omitted. Relay $r_2$ is excited through the current impulse resulting when the mine cable bridges a pair of electrodes $E_1$ and $E_2$. The battery plates of B may consist, for example, here of aluminum and iron and form so-called valve rectifying cells, which are attached to the electrode leads so that when the switch is closed the potential of the electrode leads cannot pass current into the auxiliary leads $d$, $e$. The valve cells act as a throttle in one direction of the current while in the opposite direction current can pass through in known manner.

Figure 21:
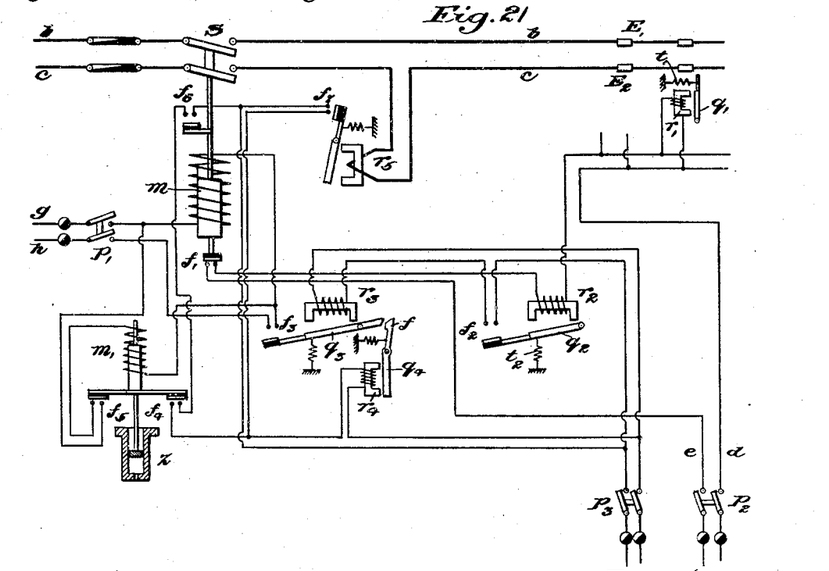
Fig. 21 is a complete wiring diagram of the circuit, provided with relays and retarding arrangements.
Figure 22:
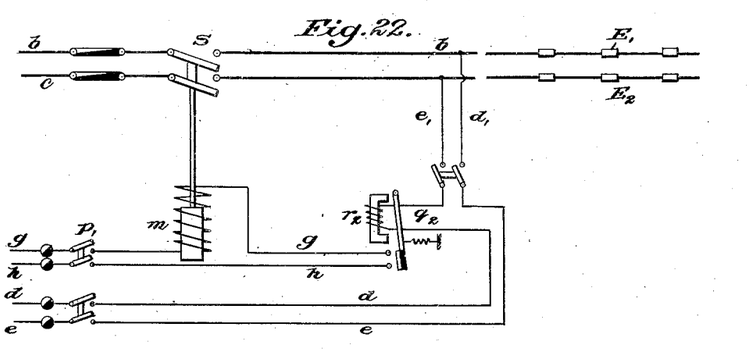
Fig. 22 is a modified arrangement similar to Fig. 20.

Considering now the operation of the circuit of Fig. 21, at first, the magnetic switch S and switches $p_1$, $p_2$, $p_3$ are open, relays $r_1$, $r_2$, $r_3$, $r_4$, are not excited, likewise neither solenoids $m$, $m_1$. By closing the circuit over $p_2$ low tension current is supplied to the A. C. leads $d$, $e$. Thereby the relay $r_1$ is excited and its armature $q_1$ attracted, so that very little current is taken up by the relay. Relay $r_2$ connected in series with the relay is excited at the same time, although the excitation is not sufficient to attract the armature $q_2$, held by a spring $t_2$, contact $f_2$ still remains open.

The circuits over $p_3$, $p_1$ are then closed, so that all auxiliary leads of the switch or circuit mechanism are closed. Now when grapple claw W of electrodes $E_1$ (see Fig. 4) engages a mine cable sliding along the search line $a$ the armature $q_1$ (see Fig. 21) is mechanically removed from relay $r_1$. The resulting current impulse excites relay $r_2$, armature $q_2$ is attracted and closes the contact $f_2$ for relay $r_3$, the latter is excited and armature $q_3$ attracted, whereby contact $f_3$ is closed and solenoids $m$ and $m_1$ are excited. The circuit S is closed and the vacuum time mechanism Z released and drawn up. Simultaneously with the attraction of armature $q_3$ a detent $f$ holds its outer end so that armature $q_3$ cannot drop back.

The connecting movement of circuit switch S with contacts $f_1$ and $f_6$ attached thereto breaks the circuit $d$, $e$, renders $r_2$ currentless, whereby armature $q_2$ releases and thereby makes relay $r_3$ also currentless. Armature $q_3$, however, is retained by the detent $f$ of armature $q_4$ whereby contact $f_3$ for solenoid $m$ remains closed.

Through the excitation of solenoid $m_1$ the vacuum time mechanism was actuated and by simultaneous removal of contact bridges $f_4$ and $f_5$, relay $r_4$ and solenoid $m_1$ are rendered currentless. On termination of the vacuum created in Z, contacts $f_4$ and $f_5$ again close, relay $r_4$ receives current over lead $p_3$ and contacts $f_4$ and $f_6$, armature $q_4$ is attracted, whereby detent $f$ and therewith the unexcited armature $q_3$ are released, current cut off from solenoid $m$, switch S opened and the source of energy cut off from the electrodes.

With the disconnecting of switch S contact $f_6$ is broken and relay $r_4$ made currentless. At the same time contact $f_1$ closes the leads $d$, $e$ and the indicator relay $r_1$ is again excited. The apparatus is ready for a new connecting operation.

Positioned parallel with relay $r_4$ is a maximum current relay $r_5$ which excites the release relay $r_4$. The detent $f$ with armature $q_3$ is released, contact $f_3$ is broken, solenoid $m$ rendered currentless and thus switch S at once disconnected, when a certain intensity of current is exceeded.

The changes of excitation in relay $r_1$ and thereby the automatic control of the entire switch or circuit plant is effected by the mechanical movement of armature $q_1$ through the action of the steel cable to be severed.

By directly attaching leads $d$, $e$ over $d_1$ and $e_1$ to the main leads $b$, $c$ (see Fig. 23), the bridging of the electrodes by the wire cable itself and the resulting current impulse may be utilized for connecting in the apparatus, particularly so when the constantly connected indicator current (D. C. or A. C.), which is to be selected of suitable potential, is only of slight magnitude and thus attended with low loss of energy.

This applies for a cutting mechanism according to Fig. 1; normally herein the search line $a$ is further removed from the cutting electrodes $E_1$. Consumption by the indicator current thus remains very slight and the excitation of relay $r_2$, see Fig. 21, may be so adjusted that armature $q_2$ is not actuated. However, when search line $a$ with mine cable $s$ comes into the vicinity of the electrode $E_1$ there will be a strong current change which suffices with certainty to actuate relay $r_2$ and therewith put the severing mechanism in readiness. The complete diagram of Fig. 21 shows this circuit and the safety devices (fuses or the like) provided therein to prevent injuries, back action, of individual currents on each other, whether A. C. over D. C. or high over low potential.

Fig. 1 shows another embodiment for heavy search lines far removed from the vessel. In such case use is made of an auxiliary search line $b$ which, when the boat travels, is moved in front of a non-insulated current lead $a$ and an insulated current lead $c$ therebehind. The auxiliary search line is first held back by the mine cable. These movements of the auxiliary search line are then imparted directly to the auxiliary control mechanism $L_1$, which is actuated electrically or mechanically and moves the current lead $a$ forward and backward.

Figure 23:
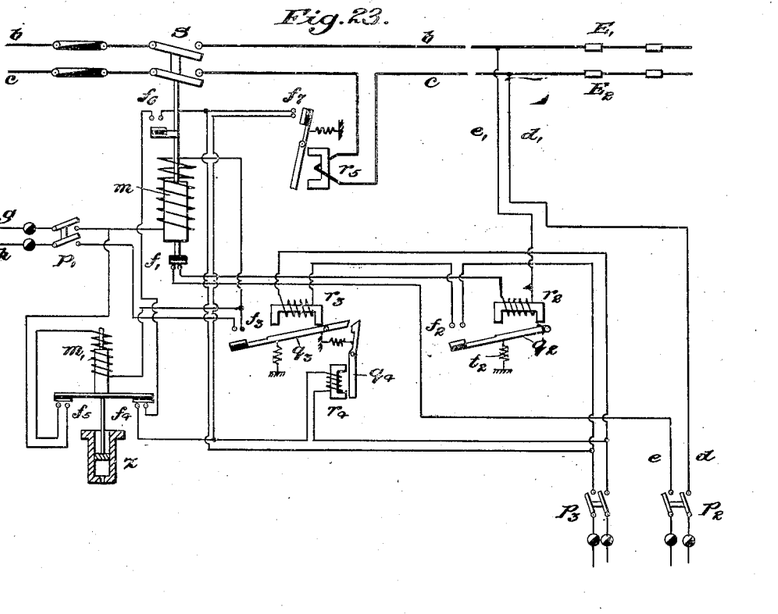
Fig. 23 is a further modification of the complete system shown in Fig. 21.

The movements of the auxiliary search line $b$ or of the search line $a$ may also be utilized for the direct mechanical connection and disconnection of armature $q_2$ of relay $r_2$, whereby other automatic control movements may be effected according to Figs. 21 and 23.

Furthermore, with respect to the diagram, Fig. 23, with relay $r_2$ attached directly to the electrode leads by means of leads $d_1$ and $e_1$, aluminum-iron batteries may be used to throttle the current, in order to prevent injuries, back actions of different circuits on each other, as previously mentioned. Such valve cells are shown in Fig. 25 connected in the leads $d_1$ and $e_1$ whereby relay $r_2$ is excited by a current impulse resulting directly by the bridging of the electrodes by a wire cable.

Since electrical severing under water in general is known it is unnecessary to describe the electrodes in further detail. The insulating methods are also generally old. The present case, however, relates to requirements which are difficult to fulfill by reason of the great mechanical and electrical strains on the material. It is, therefore, contemplated that use be made of electrodes sharpened to a cutting edge which are completely insulated all around with enamel. The latter material provides sufficient insulating protection, is easily broken away at the contact points with the wire cable so that rapid contact takes place, and wears off uniformly with the electrodes in the severing operation.

Use may be made of all conductive materials as electrodes, and for the plates of different polarities, different electrodes or electrodes composed of different materials may be used.

What I claim is:

1. Arrangement for clearing mine fields by moving vessels towing submerged electrodes for severing the mine cables, comprising a source of electric energy on one of the vessels, current leads extending between the vessels and connecting with the said source, a plurality of electrodes connected to and distributed along the current leads and normally in open circuit relation thereto, adjacent electrode elements being connected to leads of opposite polarity, selected ones of which electrodes are formed as grappling elements, whereby the mine cable engaging a current lead slides along the same due to the mobility of the towed lead until the cable contacts with an electrode and is there subjected to the severing action of the source of electric energy, the cable completing the circuit through a set of electrodes of opposite polarity and through the said leads.

2. Arrangement for clearing mine fields by moving vessels towing submerged electrodes for severing the mine electrodes, comprising a source of electric energy on one of the vessels, current leads extending between the vessels and connecting with the said source, at least one of the said leads being insulated to prevent accidental shorting between the leads, a plurality of electrodes connected to and distributed along the current leads, and normally in open circuit relation thereto, adjacent electrode elements being connected to leads of opposite polarity, selected ones of the said electrodes being formed as grappling elements, whereby the mine cable engaging a current lead slides along the same due to the mobility of the towed lead until the cable contacts with an electrode and is there subjected to the severing action of the source of electric energy, the cable completing the circuit through a set of electrodes of opposite polarity and through the said leads.

3. Arrangement for clearing mine fields by moving vessels towing submerged electrodes for severing the mine cables, comprising a source of electric energy on one of the vessels, current leads extending between the vessels and connecting with the said source, at least one of the said leads being insulated to prevent accidental shorting between the leads, the leads being arranged one behind the other, a plurality of electrodes connected to and distributed along the current leads and normally in open circuit relation thereto, adjacent electrode elements being connected to leads of opposite polarity, selected ones of the said electrodes being formed as grappling elements, whereby the mine cable first engages one of the current leads, and in moving this lead rearwardly due to its mobility until the cable contacts with an electrode on the other leads, is there subjected to the severing action of the source of electric energy, the cable completing the circuit through a set of electrodes of opposite polarity and through the said leads.

4. Arrangement for clearing mine fields by moving vessels towing submerged electrodes for severing the mine cables, comprising a source of electric energy on one of the vessels, current leads extending between the vessels and connecting with the said source, one of said leads being non-insulated and acting as a tow line, the other lead being insulated and arranged directly behind the non-insulated lead and connected thereto by retaining members, a plurality of electrodes connected to and distributed along current leads, and normally in open circuit relation thereto, adjacent electrode elements being connected to leads of opposite polarity, selected electrodes forming grappling elements, whereby the mine cable, upon engaging a current lead, slides along the same due to the mobility of the towed leads until the cable contacts with an electrode and is there subjected to the severing action of the source of electric current, the cable completing the circuit through a set of electrodes of opposite polarity and through the said leads.

5. Arrangement for clearing mine fields by moving vessels towing submerged electrodes for severing mine cables, as in claim 1 in which the electrodes are laterally displaced around and axially along the respective leads and project radially from the periphery thereof.

6. Arrangement for clearing mine fields by moving vessels towing submerged electrodes for severing mine cables, as in claim 1, wherein the electrodes are provided with outwardly thickened portions facing the adjacent leads and insulated, for preventing undesired contact with the leads and whereby the severing surfaces of the electrodes are protected.

7. Arrangement for clearing mine fields by moving vessels towing submerged electrodes for severing the mine cables, as in claim 1 wherein the electrodes are provided with thickened portions formed by insulation by means of which undesired contact is prevented with and the severing surfaces of the electrodes are protected and which coating of insulation wears off at the same rate as the severing surfaces of the electrodes.

8. Arrangement for clearing mine fields by moving vessels towing submerged electrodes for severing mine cables, comprising a source of high potential and a source of low potential A. C., current leads extending between the vessels, selected ones of the said leads connecting with the high potential and selected other leads connecting with the low potential source, a plurality of electrodes adapted to be connected to the high potential leads and distributed along the same, the adjacent electrodes being connected to leads of opposite polarity, the source of low potential A. C., being normally connected to selected other leads and the high potential source being normally disconnected from any of the leads, and means for connecting-in the high potential work circuit to the leads connected with the electrodes as a result of the mine cable-to-be-severed changing the current intensity in the closed low potential A. C., current before the severing operation, and means operable as an incident to the action of the first-mentioned means for disconnecting the high potential source from its leads after the severing operation is completed.

9. A circuit arrangement for mine clearing apparatus with towing submerged electrodes, comprising a source of high potential and a source of low potential A. C., current leads extending between the vessels, selected ones of the said leads connecting with the high potential and selected other leads connecting with the low potential source, a plurality of electrodes adapted to be connected to the high potential leads and distributed along the same, adjacent electrodes being connected to leads of oppostie polarity, the source of low potential A. C., being normally connected to selected other leads and the high potential source being normally disconnected from any of the leads, and means for connecting-in the high potential work circuit to the leads connected with the electrode as a result of the mine cable-to-be-severed changing the current intensity in the closed A. C., circuit before the severing operation and for disconnecting the high potential source from its leads after the severing operation is completed, said means comprising indicator relays with spring-biased armatures connected in parallel in the low potential A. C., circuit at the electrodes, and a normally open solenoid switch for the high potential circuit the solenoid of which is connected to and is controlled by the high potential A. C., circuit, whereby, before the severing operation, the mine cable contacting with a pair of electrodes, by moving the armature of the associated respective indicator relay causes the current in the A. C. circuit to be intensified and causes excitation of the solenoid switch to close the same, and whereby, after the severing operation the spring moves the armature of the indicating relay to its normal position, resulting in throttling the current in the low potential A. C., circuit, and in the solenoid, again breaking the circuit between the high potential source and the electrodes.

10. A circuit arrangement for mine clearing apparatus with towing submerged electrodes, comprising a source of high potential and a source of low potential A. C., current leads extending between the vessels selected leads being connected to the high potential and selected other leads being connected to the low potential source, a plurality of electrodes adapted to be connected to the high potential leads and distributed along the same, adjacent electrodes being connected to leads of opposite polarity, the source of low potential A. C., being normally connected to certain other leads and the high potential source being normally disconnected from any of the leads, indicator relays with spring-biased armatures connected in parallel in the low potential A. C., circuit at the electrodes, a reinforcing relay in series with the indicator relays, and a normally open solenoid switch for the high potential circuit the solenoid of which is connected to and controlled by the low potential A. C., circuit, whereby a mine cable upon contacting with the electrodes by moving the armature of the associated respective indicator relay, thereby destroys the magnetic effect of the latter and produces an increase of current in the low potential A. C., circuit, which excites the amplifying relay and causes it to control the solenoid switch to operate the same and to thereby close the high potential circuit to the electrodes, and whereby, after the severing operation the spring moves the armature of the particular indicating relay which has been operated back to normal position, to cause the restoration of all of the circuits to their initial condition.

11. A circuit arrangement for mine clearing apparatus with towed submerged electrodes, comprising a source of high potential and a source of low potential A. C., current leads extending between the vessels, certain of the leads being connected to high potential and certain other leads being connected to the low potential source, a plurality of electrodes adapted to be connected to the high potential leads and distributed along the same, adjacent electrodes being connected to leads of opposite polarity, the source of low potential A. C., being normally connected to selected other leads and the high potential source being normally disconnected from any of the leads, indicator relays connected in parallel in the low potential A. C. circuit at the electrodes for operation upon contact of the high potential leads with a mine cable, a normally open solenoid switch for the high potential circuit, the solenoid of which switch is connected to and is controlled by the low potential A. C. circuit, and a time limit mechanism operable by the solenoid switch to determine the duration of the operation of the said switch.

12. A circuit arrangement for mine clearing devices with towing submerged electrodes, comprising a source of high potential and a source of low potential A. C. current leads extending between the vessels, selected leads being connected to the high potential and selected other leads being connected to the low potential source, a plurality of electrodes being connected to the high potential leads and distributed along the same, adjacent electrodes being connected to leads of opposite polarity, the source of low potential A. C. being normally connected to selected other leads and the high potential source being normally disconnected from any of the leads, indicator relays connected in parallel in the low potential A. C. circuit at the electrodes, for operation upon contact of the high potential leads with a mine cable, a normally open solenoid switch for the high potential circuit, the solenoid of which is connected to and controlled by the low potential A. C., circuit, and a maximum current release relay in series relation in the high potential circuit and controlling the energization of the solenoid switch upon rise of current above a selected value in the said high potential circuit.

13. A circuit arrangement for mine clearing apparatus with towed submerged electrodes for severing mine cables, comprising a source of high potential and a source of low potential A. C., current leads extending between the vessels, selected leads being connected to the high potential and selected other leads being connected to the low potential source, a plurality of electrodes adapted to be connected to the high potential leads and distributed along the same, the source of low potential A. C., being normally connected to selected other leads and the high potential source being normally disconnected from any of the leads, a relay with a spring-biased armature connected in the low potential A. C. current, and means whereby a mine cable on contacting with the current leads effects the displacement of the same and actuates the armature of the relay, and causes the changing of the magnetic effect in the low potential A. C., circuit and means responsive to the said last-mentioned means for causing the connecting in of the high potential circuit with the electrodes.

14. Apparatus for removing mine fields from moving vessels comprising trailing submerged electrodes for severing the mine cables and the like, a source of electrical energy of large capacity on one of the vessels, current leads extending from vessel to vessel and connected to the poles of the said electrical source and to the electrodes, adjacent electrodes being connected to leads of opposite polarity, the electrodes being distributed about the periphery and length of the current leads and the electrodes of the same polarity being adapted as grappling elements, one of the said current leads being arranged rearwardly of the other whereby upon the mine cable meeting the front current lead, it will slide along the same until the mine cable makes contact with a set of electrodes of dissimilar polarity, as an incident to the movement of the vessels, the mine cable closing the electrode current and being severed as a result of the passage of the electrode current through the electrodes.

15. Apparatus for clearing mine fields by moving vessels towing submerged electrodes for severing the mine cables, comprising a source of electric energy on one of the vessels, current leads extending between the vessels and connected to said source, one of said leads being insulated and the other being non-insulated and annularly surrounding the insulated lead, a plurality of electrodes on and distributed along the current leads and normally in open circuit relation thereto, the electrodes on the inner insulated current lead passing through insulated openings in the surrounding current leads, and selected electrodes being formed as grappling elements, whereby the mine cable, upon engaging the outer lead slides therealong due to the mobility of the leads until it contacts with electrodes of opposite polarity on the current leads and is subjected to the severing action of the source of electric energy.

16. An apparatus for clearing mine fields by moving vessels towing submerged electrodes for severing the mine cables, comprising a source of electric current mounted on one of the vessels, mine grappling apparatus suspended at both sides of the said vessel, electrically operated severing apparatus electrically connected with the said source and attached to the said mine grappling apparatus, and means arranged at the outer end of the severing devices for swinging out the mine grappling apparatus together with the severing apparatus on passage of the vessel through the water.

17. Apparatus for clearing mine fields by moving vessels towing submerged electrodes for severing the mine cables as in claim 1, the electrodes having slot-like depressions or cavities constituting the grappling elements for maintaining the contacting mine cable in severing relation with the electrodes.

EUGEN SEIFRIED.